Patented Apr. 21, 1953

2,635,535

UNITED STATES PATENT OFFICE 2,635,535

MORDANTING

Andrew B. Jennings, New Brunswick, N. J., assignor to E. I. du Pont de Nemours & Company, Wilmington, Del., a corporation of Delaware No Drawing. Application January 31, 1946,
Serial No. 644,652

6 Claims. (Cl. 101—149.1)

This invention relates to improvements in the art of mordanting and, more particularly, to mordanting layers in photographic elements. Still more particularly it relates to processes of reproducing photographic-color images and to elements therefor which utilize novel organic mordants. Still more particularly it relates to such processes and elements wherein bis-(alpha-naphthol sulfonamide) hydrocarbons and hydrocarbon ethers are utilized as mordants in the formation of color images.

An object of this invention is to improve the art of mordanting. Another object is to provide improvements in the mordanting of photographic layers. A further object is to provide an improved method of affixing basic dyes in photographic layers by mordanting procedures. A more specific object is to provide improvements in the formation of relief images by the use of mordants for fixing basic dyes to colloid layers. Still more objects will be apparent from the following description of the invention.

It has been found that naphthol sulfonamides of the general formula

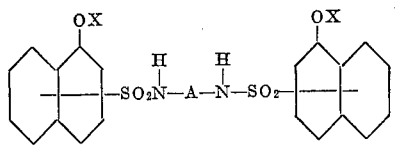

wherein a position ortho or para to the hydroxyl groups in the naphthalene nucleus is reactive and A is the divalent radical of an organic diamine of at least eight carbon atoms and contains at least one benzene nucleus and X is hydrogen, lower aliphatic acyl (RCO where R is an alkyl radical of 1 to 4 carbon atoms), and carbalkoxy groups of 1 to 5 carbon atoms, have a strong mordanting action on fibrous and water-permeable colloid materials especially protein materials, e. g., gelatin, and fix basic dyes thereto.

The radical A with the imino groups constitutes the residue of various organic aromatic diamines, e. g., 1,5-diaminonaphthalene, 2,2'-, 2,4-, and 4,4'-diaminostilbenes, p-diaminodiphenyl ether, benzidine, 1,4-bis-(aminomethyl)benzene, 1,4-bis-(beta-aminoethyl)benzene, etc. The hydrocarbon nuclei of such amines and residues may contain various innocuous radicals or groups which do not enter into dye coupling reactions with diazo compounds or color coupling developing agents. Such innocuous radicals include hydrocarbon radicals, alkoxy groups, nitro groups, halogen atoms, e. g., chlorine and bromine, sulfonic, and carboxylic acid groups.

Reactive positions ortho or para to the hydroxyl groups of the naphthalene nuclei include unsubstituted hydrogen atoms, and replaceable groups, e. g., chlorine or bromine atoms, and sulfonic or carboxylic acid groups. The preparation of such compounds is described in Jennings, United States application Serial No. 483,333, filed April 16, 1943, now United States Patent 2,395,484.

The preferred mordants have the formula

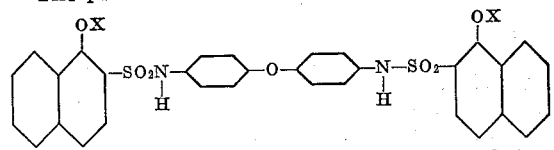

wherein X has the above significance, it being understood that the various nuclei may contain substituents as above described and the para positions to the —OX groups are reactive, e. g., unsubstituted or contain a readily replaceable group.

The invention in its broadest aspects comprises treating a material with a naphthol sulfonamide mordanting agent of the above type and applying a basic dye to the mordanted material. Such suitable materials include filaments, fibers, films, and foils composed of wool, silk, nylon, casein, gelatin, etc. The dyed material has excellent stability to light and washing.

It has been further discovered that these organic mordants are especially useful for fixing dyes in water-permeable colloid layers of photographic elements including hydrophilic hydroxyl polymers, protein, and cellulose derivative layers in the formation of relief images and in a pigmented colloid film or layer in which the said water-permeable colloid layer contains both the novel mordant and a suitable basic dye.

Basic dyes mordanted by the novel naphthol sufonamides described above evidence no change in color and the brilliancy of the original dyes is preserved throughout processing. Basic dyes, in general, are suitable in the process including:

| | Colour Index No. |
|---|---|
| Rhodamine 5G | 746 |
| Acridine Orange NO | 788 |
| Auramine | 655 |
| Basic Brown BR | 332 |
| Basic Navy Blue D Conc | 909 |
| Rhoduline Blue 6G | 658 |
| Brilliant Green B Crystals | 662 |
| Victoria Blue B | 729 |
| Fuchsine | 677 |
| Methylene Blue BX | 922 |
| Phosphine G | 793 |

Novel pigmented layers including "carbon tissues" can be advantageously prepared by admixing one of the aforedescribed mordants with water-permeable colloids, e. g., gelatin, albumin, casein, polyvinyl alcohol, etc., dispersed in aqueous solution until a uniform colloidal dispersion is obtained. The selected basic dyestuff is then added to the dispersion preferably from an aqueous solution. The solution is then chilled, set, extruded into noodles which are washed until no dye bleeds out. At this stage the mordanting agent is holding or fixing the maximum amount of basic dye. The colloidal composition is then liquefied and coated onto a support, e. g., a thin paper sheet, and dried. The mordanted colloid layers are then used for printing from color separation negatives in the same manner that the prior art "carbon tissues" are used. Three gelatin relief images containing insoluble pigments obtained from mordanting basic dyes by means of the novel agents of this invention and corresponding in color to three color separation negatives thus may be superposed in register on a support.

The invention will be further illustrated but is not intended to be limited by the following examples.

EXAMPLE I

To one kilogram of a gelatino-silver iodo-bromide emulsion containing two grams of Rhodamine B (Colour Index No. 745) was added 50 cc. of 10% 4,4'-bis(1-carbethoxynaph-2-sulfonamidophenyl) ether in water containing one gram of sodium hydroxide. The mixture was adjusted to pH 7.5 with dilute hydrochloric acid and applied to a transparent, cellulose acetate support. The element was exposed through the base from a green color separation negative and then treated in the following manner:

(1) Develop for five minutes in a solution made by admixing the Solutions A and B which follow:

(A)

| | | |
|---|---|---|
| Sodium sulfite | grams | 3.25 |
| Pyro | do | 14.15 |
| Potassium bromide | do | 3.25 |
| Water to | liter | 1 |

(B)

| | | |
|---|---|---|
| Sodium carbonate | grams | 56.6 |
| Water to | liter | 1 |

(2) Wash five minutes, then bathe in warm water (100° F.) whereupon a relief image in color is formed. The silver may be removed if desired by means of a ferricyanide bleach, e. g., a slightly alkaline solution of 5% potassium ferricyanide followed by fixing in plain hypo.

Similar elements can be made by substituting other basic dyes which form the proper colored images for color separation records. The elements can be printed from other appropriate color separation negatives in like manner. The final dye component image records can then be superimposed in register or transferred to a permanent support. Multicolored pictures of a fine gradation and uniformity superior to that obtainable with ordinary gelatin matrices are formed.

EXAMPLE II

A gelatin dispersion was made by admixing the following two solutions:

(A)

| | | |
|---|---|---|
| Gelatin | grams | 10 |
| Water | cc | 150 |

(B)

| | | |
|---|---|---|
| $C_2H_5OH$ | cc | 20 |
| 4,4'-bis(1-naphthol-2-sulfonamido-phenyl) ether | grams | 2 |
| NaOH (5 N.) | cc | 2 |
| Water | cc | 10 |

The solution was adjusted to pH 8 by the addition of acetic acid. Two grams of Rhodamine 5G (Colour Index No. 746) were then added with stirring. After a uniform dispersion was obtained, the solution was chilled, set, extruded through a die into noodles which were washed until dye no longer was removed. The noodles were melted and coated onto photographic paper. The resulting layers can be made in any desired shade or color by substitution of the appropriate basic dye. The resulting layers are then sensitized with potassium dichromate, squeegeed into contact with positive prints from color separation negatives. The pigmented layers are then stripped, laid face down on clean plastic sheets and squeegeed into firm contact. After standing for a few minutes, the combinations are immersed in warm water. The unhardened gelatin becomes softened and the paper may be stripped away. Further washing in warm water removes excess unhardened pigmented gelatin and leaves colored relief images. The images may be transferred to new supports in register.

EXAMPLE III

Elements useful in the formation of transfer prints by imbibition can be made by coating a suitable transparent support or an opaque paper support with a gelatin solution containing a naphthol sulfonamide mordanting agent of the above type, but devoid of dye, after the manner described in Example II. The layer can then be hardened by treatment in a solution of the composition:

| | | |
|---|---|---|
| Potassium dichromate | grams | 10 |
| Water | liter | 1 |

After drying, the film is heated to 120° F. for several hours. A sharp image in the form of a basic dye may then be imbibed in the hardened gelatin surface of the element by contact with a matrix carrying a relief image from a color separation negative, said image being obtained by staining a gelatin relief in a solution containing an appropriate basic dye.

This invention obviously is not limited to the particular procedures described in the above examples but, on the contrary, can be used in various other processes of producing photographic images which include the step of mordanting dyes.

An advantage of the invention resides in the superior fixing action of the mordants with respect to basic dyes. Methylene blue (Colour Index 922), rhodamine B (Colour Index 745), and auramine (Colour Index 655), for example, will not satisfactorily anchor to gelatin. However, when the present mordants are used they become fastly fixed in gelatin layers.

The "Colour Index" referred to above is the Society of Dyers and Colourists Colour Index, edited by F. M. Rowe, First Edition, January 1924, published by the Society, Bradford, Yorkshire, England.

The novel naphtholsulfonamides described above, as previously stated, can be used to mordant or affix basic dyes to other materials. Thus, they can be used in the same manner as other mordants in mordanting wool, silk, nylon, casein, etc., filaments, fibers, films, and foils, by bathing, impregnating, or precipitating on such materials, the novel sulfonamides. A practical method of treating wool comprises bathing wool yarn or fibers in an aqueous alkaline solution containing one to five per cent of the sulfonamides, then neutralizing the impregnated fiber with acid. The other materials just mentioned can be treated in an analogous manner. When basic dyes are applied to the so mordanted material, the resulting dyed material is fastly dyed and has good stability to light and washing.

A remarkable improvement for increase in light fastness of the dyed material as compared with the unmordant dyed material results from dying in accordance with this invention. Basic dyes as a class are notoriously fugitive to light, a circumstance which seriously restricts their applicability. The increased stability above referred to is quite surprising and unexpected. The novel mordants have the advantage that they admit of the use of basic dyes which are not suitable in many dyeing operations because of their fugitive character.

As many widely different embodiments of this invention can be made without departing from the spirit and scope thereof, it is to be understood that the invention is not to be limited except as defined by the claims.

What is claimed is:

1. The process which comprises treating a water-permeable colloid with an aqueous alkaline solution containing a naphthol sulfonamide of the general formula:

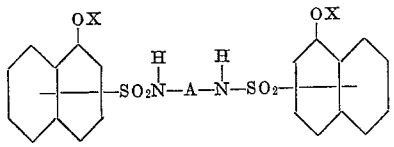

wherein one of the positions ortho and para to the OX substituent is reactive, A is the divalent radical of an organic diamine of at least eight carbon atoms which contains at least one benzene nucleus and X is a member taken from the group consisting of hydrogen, aliphatic acyl radicals of 1 to 5 carbon atoms and carbalkoxy radicals of 1 to 5 carbon atoms, and applying an aqueous solution of basic dye to the treated material.

2. The process which comprises treating a water-permeable colloid with an aqueous alkaline solution containing a naphthol sulfonamide of the general formula:

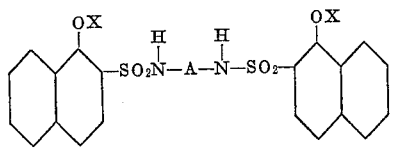

wherein A is the divalent radical of an organic diamine of at least eight carbon atoms which contains at least one benzene nucleus and X is a member taken from the group consisting of hydrogen, aliphatic acyl radicals of 1 to 5 carbon atoms and carbalkoxy radicals of 1 to 5 carbon atoms, and applying an aqueous solution of basic dye to the treated material.

3. A process as set forth in claim 1 wherein said colloid is a water-permeable protein colloid.

4. In a process of photography, the step which comprises forming in a water-permeable colloid layer an image in basic dyes by treating said colloid layer with an aqueous alkaline solution of naphthol sulfonamide of the general formula:

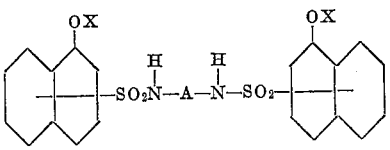

wherein one of the positions ortho and para to the OX substituent is reactive, A is the divalent radical of an organic diamine of at least eight carbon atoms which contains at least one benzene nucleus and X is a member taken from the group consisting of hydrogen, aliphatic acyl radicals of 1 to 5 carbon atoms and carbalkoxy radicals of 1 to 5 carbon atoms, and applying an aqueous solution of basic dye to the treated material.

5. A process of photography which comprises coating a support with an aqueous gelatin solution containing a naphthol sulfonamide of the general formula:

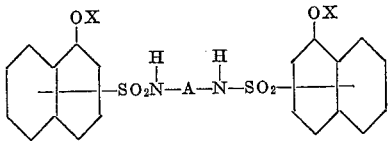

wherein one of the positions ortho and para to the OX substituent is reactive, A is the divalent radical of an organic diamine of at least eight carbon atoms which contains at least one benzene nucleus and X is a member taken from the group consisting of hydrogen, aliphatic acyl radicals of 1 to 5 carbon atoms and carbalkoxy radicals of 1 to 5 carbon atoms, hardening the coated layer with an aqueous solution of potassium dichromate, staining a gelatin relief image with an aqueous solution containing a basic dye and pressing the relief image into contact with the coated layer on said support whereby an image of such basic dye is imbibed by such coated layer and is mordanted by said naphthol sulfonamide.

6. A process as set forth in claim 5 wherein said naphthol sulfonamide is 4,4'-bis(1-naphthol-2-sulfonamido-phenyl) ether.

ANDREW B. JENNINGS.

References Cited in the file of this patent

UNITED STATES PATENTS

| Number | Name | Date |
|---|---|---|
| 1,562,828 | Hernandez-Mejia | Nov. 24, 1925 |
| 1,694,562 | Rabe et al. | Dec. 11, 1928 |
| 1,899,856 | Montmollin | Feb. 28, 1933 |
| 2,054,261 | Lierg | Sept. 15, 1936 |
| 2,107,094 | Townsend | Feb. 1, 1938 |
| 2,124,371 | Gschopf et al. | July 19, 1938 |
| 2,146,619 | Bowlby | Feb. 7, 1939 |
| 2,179,239 | Willmanns et al. | Nov. 7, 1939 |
| 2,186,849 | Willmanns et al. | Jan. 9, 1940 |
| 2,312,913 | Kirby | Mar. 2, 1943 |
| 2,328,900 | Grimm et al. | Sept. 7, 1943 |
| 2,395,484 | Jennings | Feb. 26, 1946 |
| 2,435,629 | Jennings | Feb. 10, 1948 |

FOREIGN PATENTS

| Number | Country | Date |
|---|---|---|
| 372,620 | Great Britain | May 12, 1932 |
| 465,823 | Great Britain | May 13, 1937 |